May 22, 1945.  J. KIS  2,376,492
UNIVERSAL MACHINE HEAD BRAKE
Filed Aug. 14, 1943

INVENTOR.
John Kis,
BY Morsell + Morsell
ATTORNEYS.

Patented May 22, 1945

2,376,492

UNITED STATES PATENT OFFICE 2,376,492

UNIVERSAL MACHINE HEAD BRAKE

John Kis, Racine, Wis.

Application August 14, 1943, Serial No. 498,649

2 Claims. (Cl. 188—77)

This invention relates to improvements in universal machine head brakes.

In my prior Patent No. 1,834,716 I have shown and described a universal machine head adapted for mounting on a machine tool spindle for boring inside and outside tapers, turning outside taper hubs, turning perfect radii, undercutting or forming straight or bevel faces, etc. The machine head of my prior patent is susceptible of complicated movements, adjustments, and feeds and is characterized by the fact that the feed of the head is independent of the feed of the machine and the head revolves with the machine tool spindle. Rectilineal movement of a tool-carrying sliding bar, and other feeds, are controlled by an operating lever which in my prior patent, as well as in the present improvements, is manually manipulated to effect an engagement or disengagement as between a spindle driven gear in the machine head and a feed gear shaft or sleeve.

While the lever operated brake mechanism shown and described in my prior patent is effective and accomplishes its purpose it has been found that it is highly desirable to obtain cessation or progression of a feed instantaneously upon a slight touch imparted to the lever as this will prevent the tool from digging in and damaging the work or from cutting beyond the desired depth. With the above in mind it is, therefore, a general object of the present invention to provide an improved brake for a universal machine head of the type covered in my prior Patent No. 1,834,716 which, when manually touched or manipulated, will effect an instantaneous engagement or disengagement of the machine head feed.

A further object of the invention is to provide a universal machine head brake which, through an easy and quick manipulation of the brake control lever, will regulate the extent of feed of the machine tool to a thousandth part of an inch.

A further object of the invention is to provide a universal machine head brake which is rapidly and powerfully operated through opening and closing movements imparted to spring urged twin dogs.

A further object of the invention is to provide a universal machine head brake which is very simple in construction and operation, is strong and durable, is efficient and instantaneous in its operation, is inexpensive to manufacture, is applicable to universal machine heads now in service, and is well adapted for the purposes set forth.

With the above and other objects in view the invention consists of the improved universal machine head brake, and its parts and combinations as set forth in the claims, and all equivalents thereof.

In the accompanying drawing in which the same reference characters indicate the same parts in all of the views.

Figures 1, 2, 3, 4:
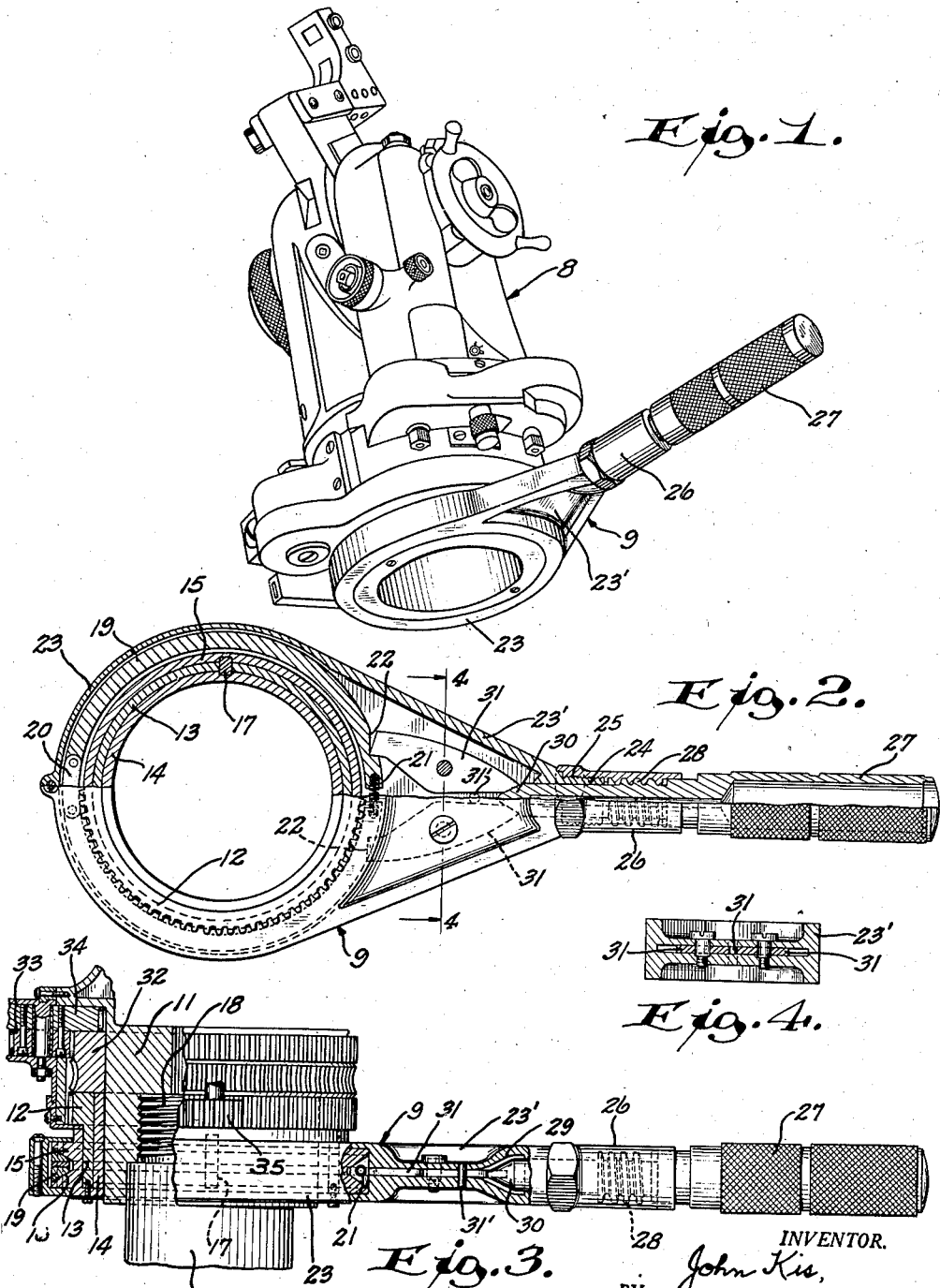
Fig. 1 is a perspective view of a universal machine head equipped with the improved brake.
Fig. 2 is a top view of the brake mechanism per se with parts broken away and in longitudinal section.
Fig. 3 is a side view of the improved brake and adjacent portions of the parts of a universal machine head which are influenced by actuation of the brake, parts being broken away and in section and the gear enclosing casing being omitted.
Fig. 4 is a detail transverse sectional view taken on line 4—4 of Fig. 2.

Referring now more particularly to the drawing it will appear that a universal machine head is indicated generally by the numeral 8. Said universal machine head is fully illustrated and described in U. S. Patent No. 1,834,716 to John Kis, dated December 1, 1931. The present invention resides in an improved manually operated brake mechanism, generally designated by the numeral 9, and its association with parts of said universal machine head which are under the control of the brake.

The universal machine head 8 is adapted to be mounted on the spindle 10 of a machine and includes a body extension 11 having a threaded bore 18 securely engaged by an end portion of the machine spindle 10. The universal machine head 8 also includes a main drive gear 12 having a collar or sleeve-like tubular extension 13 which surrounds a portion of the body extension 11 with an interposed bronze bushing 14. Surrounding the sleeve extension 13 is a circular cast iron brake body 15 whose outer surface is formed with a V-recess 16. The brake body has a pressed fit with the sleeve extension 13, and the bushing 14, extension 13 and brake body 15 are all connected by a key 17.

A split V-shaped ring 19, preferably formed of steel, is lodged within the recess 16 of the brake body 15. Said ring, in the form of two complementary semicircular sections, has one pair of adjacent ends of the sections pivotally connected by a link 20. The other pair of ends of said ring sections are in adjacency, but are urged toward a slightly expanded or open position by a spring 21. Outer face portions of said ends of the ring sections are formed with shouldered notches 22.

A casing 23 surrounds and encloses the elements 13, 14, 15 and 19. The major portion of said casing is of circular contour but the side thereof which encloses the notched ends of the ring sections is formed as a laterally extended, tapered casing extension 23' whose extremity is cylindrical and tubular, as at 24, and has external screw threads 25 securely engaged by a coupling nut 26.

A turnable handle is indicated by the numeral 27 and the outer end of the same is knurled for hand engagement and operation. Inwardly of the knurled portion the handle is reduced to extend into and through the coupling nut 26, the bored and cylindrical casing extremity 24, and into a hollow interior portion of the casing extension 23'. That portion of the handle which is within the coupling nut is formed with Acme threads 28 engaging similar threads within said coupling nut. The inner end of the handle disposed within an enlarged pocket 29 in the casing extension 23', is tapered, as at 30.

A pair of twin dogs 31 are intermediately pivotally mounted within the casing extension 23' and between one pair of angled ends of said dogs the tapered end 30 of the handle is disposed to contact and actuate said dogs upon progression of the handle. The other ends of said dogs, which are spread, have shouldered extremities lodged within the shouldered notches 22 of the ring section 19. A stop pin 31' is disposed between adjacent edge portions of the dogs.

With the universal machine head mounted on the spindle 10 of a machine and when the power is on the spindle 10 will be constantly revolved, as will the body extension 11 which is connected to and a part of the head 8. The latter, carrying the tool, is under constant rotation relative to work.

The improved brake functions in the following manner: when the brake handle 27 is manually engaged and has been turned to project its inner end to effect a clamping action of the dogs 31 relative to the split ring 19, the brake is engaged. This then becomes effective to hold the main drive gear 12 against rotation with the head 8. As spindle 10 and body extension 11 are rotating and thereby rotating the head 8, a certain train of gears, worms and pinions disposed about the circumference of the gear 12 are caused to rotate on their own axes and thus become driving gears for various feed movements of the universal head machine tool, all as is brought out in Patent No. 1,834,716. Included in this category are gears 33 and 34 shown in Fig. 3, and a pinion 35 is in mesh with the gear 12. When, however, the brake handle 27 is turned to retract the tapered end 30 from the ends of the dogs 31, the spread ends of the dogs can open and move outwardly under the influence of the spring 21 in the split ring 19 which expands and releases its braking engagement relative to the brake body 15. Consequently, the gear 12 then becomes disconnected from the handle 27 and is permitted to freely rotate with the turning head 8, and no independent rotation on their own axes is imparted to the various gears of the train such as the gears 33 and 34, so that the actuation of the machine head feeds is instantaneously terminated.

The feed of the universal machine head is independent of the feed of the machine on which it is mounted. As is brought out in Patent No. 1,834,716, the motion of a sliding bar which is connected with the tool is effected through the gearing encased in the head 8. The operating handle 27 is the sole mechanism which remains stationary, and by a simple turn of the operating handle the brake mechanism becomes effective to engage or release the machine feeds. The improved brake mechanism makes it possible to obtain the results instantaneously with a very slight touch or movement. Instantaneous control of the tool is thereby obtained with the result that the tool can be prevented from digging in and damaging the job or from cutting into the work further than is desired.

The improved brake is, furthermore, of simple and novel construction, is easily operated and is well adapted for the purposes described.

What is claimed as the invention is:

1. A brake mechanism, comprising a pair of relatively movable members, one of said members having an annular V-shaped groove therein, a V-shaped brake band extending into said groove and having a split, spring-urged portion to render it expansile and contractile, a housing enclosing the brake band, dogs pivotally mounted within said housing and engaging the split portion of the brake band to control expansion and contraction thereof, and a handle turnably connected with said housing and engaging said dogs to pivot the same upon projection and retraction of the adjacent end of the handle.

2. A brake mechanism, comprising a pair of relatively movable members, one of said members having an annular groove therein, a brake band extending into said groove and having a resiliently connected portion to render the band expansile and contractile, a housing enclosing the brake band, dogs pivotally mounted within said housing and engaging the resiliently connected portion of the brake band to control expansion and contraction thereof, and a handle turnably connected with said housing and engaging said dogs to pivot the same upon projection and retraction of the adjacent end of the handle.

JOHN KIS.